Aug. 27, 1935.   J. W. LOGAN, JR   2,012,747
VEHICLE BRAKING SYSTEM
Filed Nov. 7, 1933   3 Sheets-Sheet 2
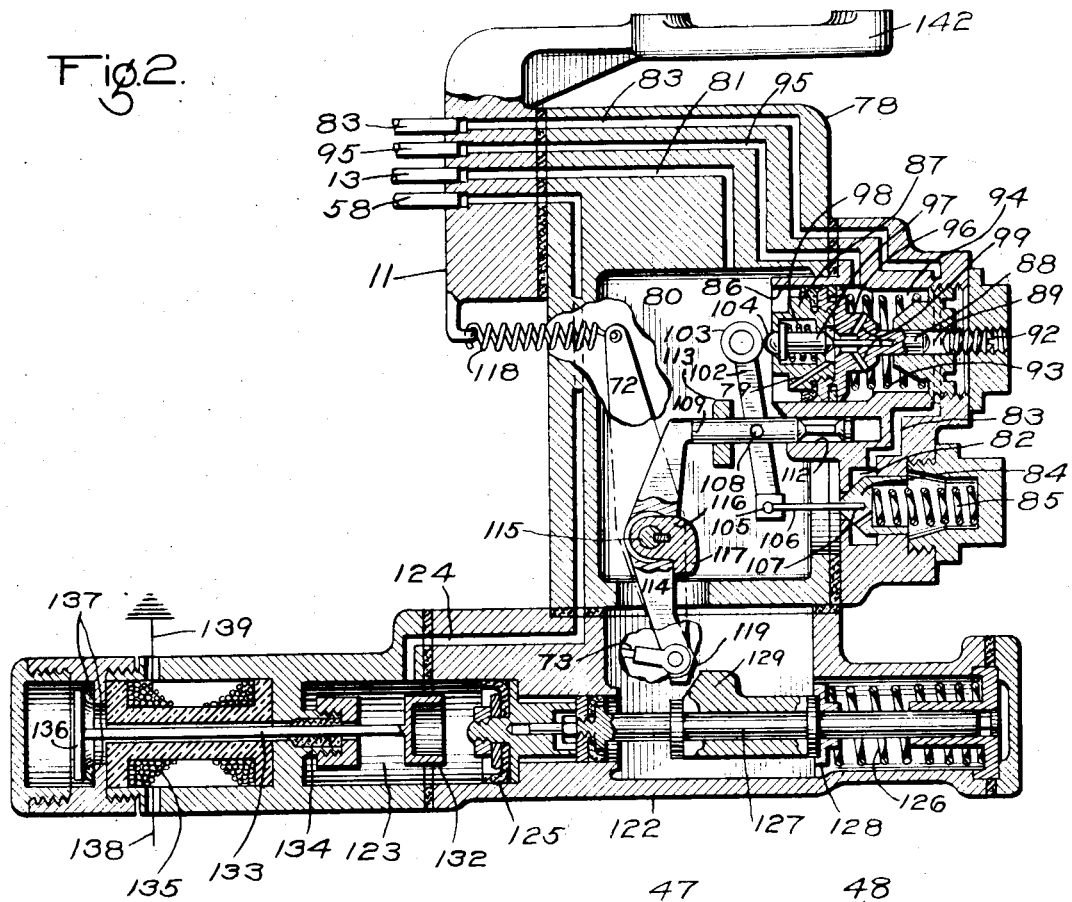
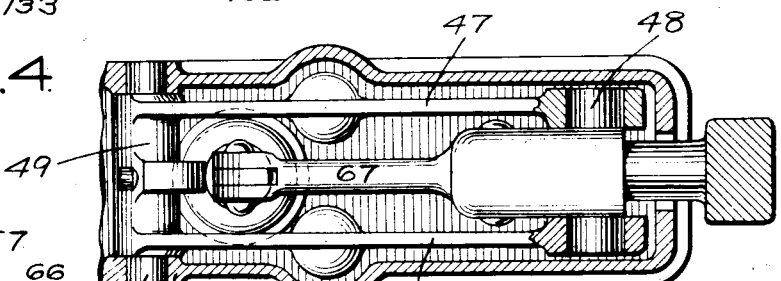
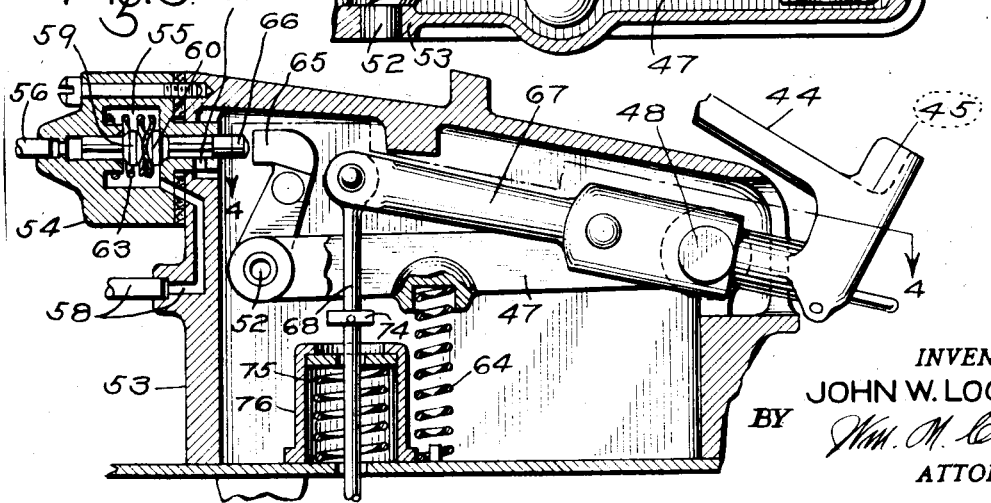
INVENTOR
JOHN W. LOGAN, JR.
BY *Wm. M. Cady*
ATTORNEY Aug. 27, 1935.     J. W. LOGAN, JR     2,012,747
VEHICLE BRAKING SYSTEM
Filed Nov. 7, 1933     3 Sheets-Sheet 3

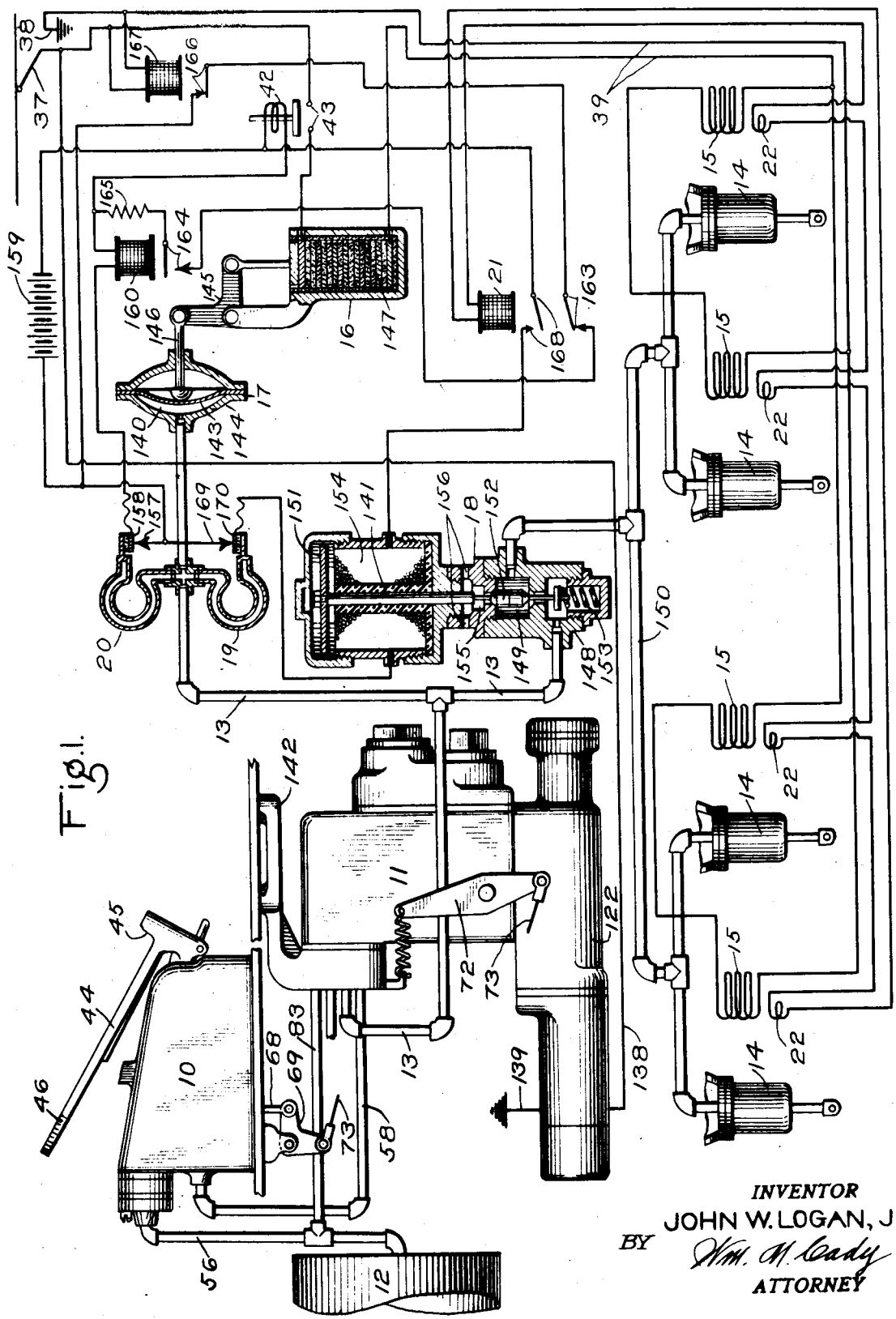

INVENTOR
JOHN W. LOGAN, JR.
BY
ATTORNEY

Patented Aug. 27, 1935

2,012,747

UNITED STATES PATENT OFFICE 2,012,747

VEHICLE BRAKING SYSTEM

John W. Logan, Jr., Wilkinsburg, Pa., assignor to The Westinghouse Air Brake Company, Wilmerding, Pa., a corporation of Pennsylvania Application November 7, 1933, Serial No. 696,993

31 Claims. (Cl. 303—3)

This invention relates to a vehicle braking system, and more particularly to such a system in which the braking effect is produced by the operation of an electro-dynamic brake combined with a fluid pressure friction brake.

In the braking of a high speed train, a desirable type of brake to employ is a brake of the electro-dynamic type, such as the brake known as the "eddy current" brake, because with an electro-dynamic brake high braking effort can be obtained at high train speeds without severe shocks due to an excessive rate of retardation as the speed of the train decreases, such as is characteristic of the well known friction brake. Furthermore, this high braking effort is obtained with an electro-dynamic brake without the friction and wear incident to the use of a friction brake.

However, as the vehicle speed decreases, the electro-dynamic brake becomes less and less effective, until at zero speed the electro-dynamic brake would have no retarding effect. It is therefore desirable to supplement the electro-dynamic braking effect by the braking effect of a friction brake, so that at low vehicle speeds the friction brake will act to provide the desired braking effect until the vehicle has been brought to a stop.

It is a general object of this invention to provide a dual braking system of this general type, and control means in conjunction therewith, for effecting an application of the electric brake at relatively high speeds and which automatically releases the electric brake and simultaneously applies the friction brake at relatively low speeds, in such a manner as to bring a vehicle to a stop quickly without appreciable shock.

Another object is to provide means for effecting concurrent application of both the electric and friction brakes at any speed for making emergency stops.

A further object is to provide a manually operated fluid pressure controlling means for applying the brakes in a system such as heretofore referred to, in which the application of both brake equipments is made in accordance with fluid pressures established by the controlling means.

A yet further object is to provide an interlock means between an electric brake equipment and a fluid pressure brake equipment which acts in accordance with the effectiveness of the electric brake to prevent application of the fluid pressure brake so long as the electric brake is effective, and to automatically release the electric brake when it becomes less effective, and to simultaneously cause the fluid pressure brake to be applied with substantially the same braking force as the electric brake, so that a vehicle may be brought quickly and smoothly to a stop.

Other important objects and advantages will be apparent from the following description taken in connection with the attached drawings, in which Fig. 1 is a schematic and somewhat diagrammatic view of one embodiment of my invention.

Fig. 2 is a diagrammatic view in section of a brake valve device forming a part of this embodiment.

Fig. 3 is a view, in section, of a foot pedal control device.

Fig. 4 is a plan view along the line 4—4 of Fig. 3.

Referring now principally to Fig. 1, the embodiment illustrated comprises a brake valve device 11 operatively associated with a foot pedal control device 10 to control the supply of fluid under pressure from a suitable source, such as a main reservoir 12, to effect an application of the brakes in both a fluid pressure brake equipment and an electric brake equipment.

Figure 5:
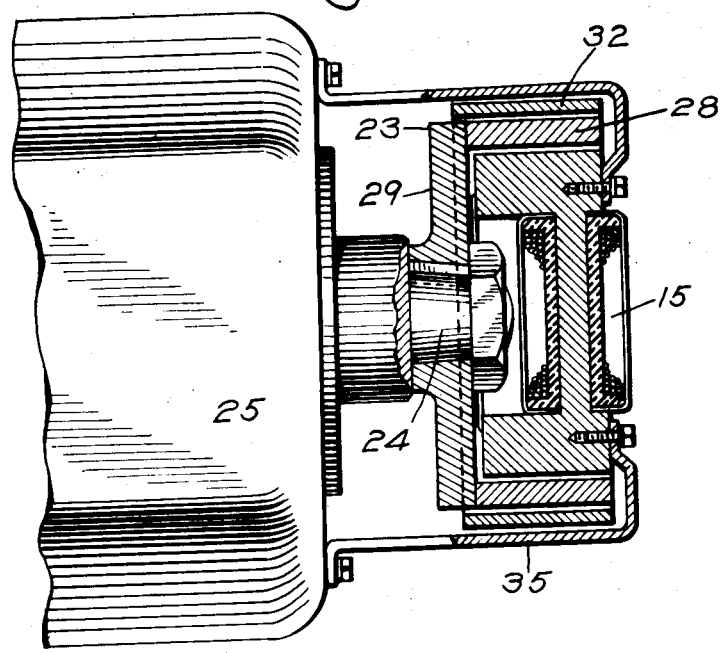
Fig. 5 is an elevation, partly in section, showing one form of combined friction brake and electric brake of the eddy current type, associated with the drive shaft of a vehicle motor.
Figure 6:
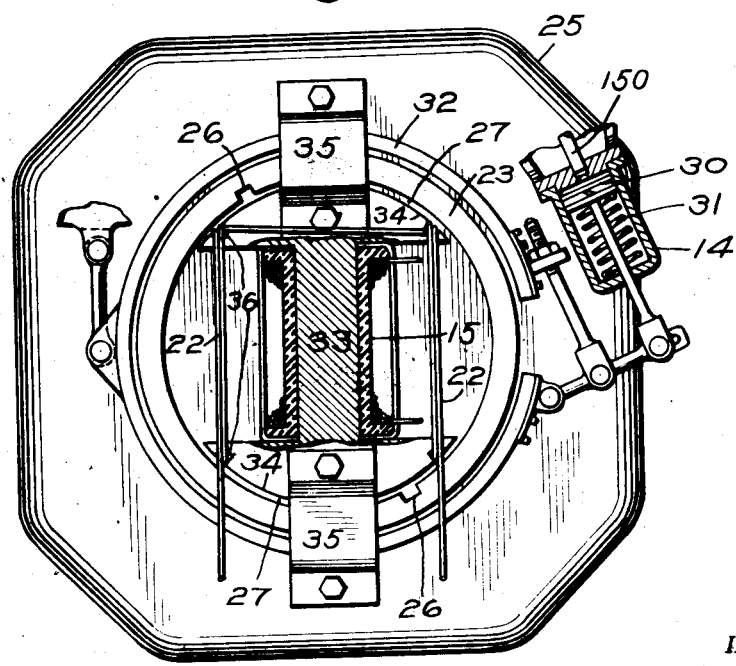
Fig. 6 is an end view of the structure in Fig. 5 as viewed from the right.

The fluid pressure brake equipment includes brake cylinders 14 adapted to actuate a friction brake of a vehicle, such for example as a brake of the drum type shown in Figs. 5 and 6.

The electric brake equipment is preferably of the electro-dynamic type, such as the eddy current type illustrated, which is provided with an exciting winding 15, which initiates the braking, a current regulating rheostat 16 in series with the winding 15, and a fluid pressure actuated device 17 for actuating the rheostat in accordance with fluid pressures supplied by the brake valve device 11.

Interlock apparatus for preventing concurrent application of the brakes of the two brake equipments for one condition of the control apparatus, and to effect concurrent operation for another condition may include a magnetically operated valve device 18, Bourdon tubes 19 and 20, a checking relay 21, and checking or secondary windings 22 forming a part of the eddy current brake equipment.

If a fluid pressure brake of the drum type is used an electro-dynamic brake of the eddy current type may be assembled therewith so as to use a common brake drum member 23, as shown in Figs. 5 and 6. The brake drum 23 is rigidly secured to the drive shaft 24 of a vehicle motor 25, and preferably has an annular braking portion 28 of magnetic material with axially extending slots 26 on the inner periphery thereof, the braking portion 28 being suitably secured to a hub portion 29 of non-magnetic material, for a purpose which will appear presently.

As shown in Fig. 6, each brake cylinder 44 contains a piston 30 operatively connected to a brake band 32 adapted to frictionally engage the brake drum 23. A release spring 31 acts on piston 30 to normally maintain the parts in release position, and the piston 30 is operated by fluid under pressure supplied thereto through pipe 150 to cause the brake band 32 to frictionally engage the brake drum 23.

The eddy current brake may have its exciting winding 15 disposed on a magnetic core member 33 mounted within but relatively stationary with respect to the brake drum 23. The core member 33 preferably has pole faces 34 corresponding to but spaced from the inner peripheral surface of the brake drum 23, and is supported from the frame of the vehicle motor 25 by brackets 35 preferably of non-magnetic material. The heretofore referred to checking windings 22 are disposed in axially extending slots 36 in the pole faces 34, as shown.

The eddy current brake shown is applied by energizing the exciting winding 15, whereupon a magnetic flux is established having a path from one pole face 34, across the air gap 27 between that pole face and the brake drum, around the two halves of the magnetic portion 28 of the brake drum in parallel, across the other air gap 27, to the other pole face 34, and thence into the core member 33 back to the first pole face. By making the brake drum hub portion 29 and the core supporting brackets 35 of non-magnetic materials substantially all of the flux produced by the energized winding 15 is confined to this path. If the brake drum is rotating, eddy currents will be generated in the magnetic portion 28, and these eddy currents react with the flux producing them to retard rotation of the drum and hence brake the vehicle with which it is associated.

When the brake drum is rotating there is a variation in the flux across the air gaps 27 whenever the slots 26 in the magnetic portion 28 of the drum pass across the pole faces 34. This variation, which is periodic, causes a similar change in the flux cutting the checking winding 22, and there is therefore induced in the checking winding an E. M. F. proportional to the frequency of these changes, which is in turn proportional to the speed of the vehicle. Since the eddy currents generated in the drum and effective in braking the vehicle are also proportional to the speed of the vehicle, the E. M. F. induced in the checking windings may be used for control purposes as an indication of the effectiveness of the eddy current brakes, as will more fully hereinafter appear.

In Fig. 1 there is diagrammatically indicated, by way of illustration, fluid brake cylinders and eddy current brake windings for four such combined brakes, corresponding to four driving motors, but it will be apparent that any other similar arrangement may be used.

The eddy current brake exciting winding 15 is energized from a source of current supply as by a trolley 37 and a ground connection 38, which may be a vehicle track, third rail, or the like, and receives current therefrom through conductors 39.

The exciting windings may or may not be interconnected, as desired, the series-parallel arrangement shown in Fig. 1 being an example of one arrangement that may be used.

The degree of application of the eddy current brakes is controlled by varying the current in the exciting windings 15 by means of a rheostat such as that shown at 16. Varying the current supplied varies the flux produced. The variations of this current are made to correspond with variations in fluid pressures controlled by the foot pedal control device 10, as will be evident presently. A circuit breaker 42 is provided with contacts 43 in series with the exciting windings 15 to automatically connect and disconnect the windings to the current supply at proper times as will hereinafter be described.

For controlling application of the brakes a foot pedal control device 10 of the type shown in Figs. 3 and 4 may be used. This device is provided with a foot pedal 44 having a heel portion 45 and a toe portion 46. The foot pedal is rotatably held between parallel arms 47, as at 48. The parallel arms 47 are rigid with a hub member 49 pivotally mounted on a pin 52 supported in a frame or housing 53, so that the foot pedal is rotatable about the pin 52 by pressure on the heel portion 45 and rotatable about the pivot 48 by pressure on its toe portion 46.

A pilot valve device 54 is adapted to control the admission and release of fluid under pressure to and from a piston chamber 123 of the brake valve device 11, for a purpose to be hereinafter described, and comprises valves 59 and 60 contained in a valve chamber 55. The valve 60 is provided with a stem 66 adapted to be engaged by an arm 65 rigid with the hub member 49, and when unseated the valve 60 permits the venting of fluid under pressure from the valve chamber 55 and piston chamber 123 through passage 124 and pipe and passage 58 to the atmosphere by way of the port 57. The valve 59 controls the supply of fluid under pressure from supply pipe 56 to valve chamber 55, and with the valve 60 held normally seated by a spring 63, the valve 59 permits the flow of fluid under pressure to valve chamber 55 and thence through pipe and passage 58 to piston chamber 123. In Fig. 3 the foot pedal is shown in the position when its heel portion 45 has been depressed.

The foot pedal 44 has movable therewith about the pivot 48 an extension arm 67 pivotally connected to one end of a drive rod 68 having its other end pivotally connected to a bell crank 69. The bell crank 69 may be suitably mounted at any convenient point and is connected with an operating lever 72 associated with the brake valve device 11 by a cable 73. Thus an operator's heel pressure controls the pilot valve device 54 while his toe pressure (or ankle movement) controls the brake valve device 11.

The drive rod 68 is provided with a collar 74 rigidly secured thereto and adapted to engage and compress a spring 75 in a cage 76 after a predetermined "free" or unopposed movement of the foot pedal 44 about the pivot 48. As will appear later, the free or unopposed travel of the foot pedal represents its range for controlling the degree of application of the brakes for making normal stops, and the further travel against opposition of the spring 75 represents its range for making emergency stops.

The brake valve device 11 is preferably of the self-lapping type and, as shown in Fig. 2, is similar to that illustrated and described in the copending application of David W. Lloyd for Safety car equipment, Serial No. 698,242, filed November 16, 1933.

As illustrated in the present application the device comprises a casing 78 composed of a plurality of sections assembled together and defining a pressure chamber 80. The pressure chamber 80 is constantly in communication with a pipe 13 by way of a passage 81. A supply valve chamber 82 is in constant communication with the main reservoir 12 by a pipe and passage 83. The chamber 82 contains a supply valve 84 urged toward a seated position by a spring 85 and adapted to control communication between the supply valve chamber 82 and the pressure chamber 80.

The casing 78 has therein a cylinder 86 with one end opened to the chamber 80 and operatively mounted in the cylinder is a movable piston 87 having a guiding element 88 slidably interfitting a bore 89 in the end of which is an adjusting screw 92. The piston 87 is subject on one side to fluid pressure in the chamber 80 and on the other side to pressure from a spring 93 contained in a chamber 94 which is constantly in communication with the atmosphere through a pipe and passage 95.

The piston 87 is provided with a valve chamber 96 interiorly thereof in constant communication with the pressure chamber 80 through passage 79 and containing a release valve 97 urged away from its seat by a spring 98. The release valve 97 controls the venting or release of fluid under pressure from the chamber 80 to the atmosphere by way of passage 79, valve chamber 96, passages 99, chamber 94 to the exhaust pipe and passage 95.

For controlling the operation of the supply and release valves 84 and 97, respectively, a mechanism is provided comprising spaced levers 102 having a roller 103 rotatably held between their upper ends and having their lower ends pivotally connected to a rod 106 as by a pin 105. The rod 106 has its free end slidably disposed in a recess 107 in the supply valve 84. Intermediate their ends the levers 102 are pivotally secured, as at 108, to a floating pivot carrier 109, slidably guided in a bore 112 and a lug 113.

For actuating the floating pivot carrier 109 there is provided an intermediate lever 114 freely disposed on a shaft 115 rotatably journaled in the casing 78. The shaft 115 has rigidly secured thereto the heretofore referred to operating lever 72 and a lug element 116 having a finger 117 overlying the intermediate lever 114, so that when a pull is exerted on the heretofore referred to cable 73, the operating lever 72 is rotated in a clockwise direction against opposition of a spring 118 to cause the finger 117 to engage the intermediate lever 114 to move the floating pivot carrier 109 to the right. The finger 117 is of such a design as to permit the intermediate lever 114 to be rotated in a clockwise direction by other means, as by pressure on its lower end 119 from the right.

An emergency device 122 forms a part of the brake valve device 11 for controlling the operation of the supply and discharge valves during certain emergency conditions. This device comprises a piston chamber 123 having constant communication with the chamber 55 of the heretofore described pilot valve device 54, by the heretofore referred to passage 124 and pipe and passage 58. Within the piston chamber 123 is disposed a movable piston 125 urged to the left by a spring 126 acting upon a collar 128 secured to the piston rod 127. The piston rod 127 may connect with the piston 125 in the manner shown. The piston 125 is urged to the right against opposition of the spring 126 when fluid under pressure is supplied to the chamber 123, as when valve 59 in the pilot valve device 54 is unseated.

When the fluid pressure in the chamber 123 is reduced the piston 125 will be moved to the left by the spring 126 and this movement is made to cause the intermediate lever 114 to rotate in a clockwise direction by engagement of a latch block 129, secured to the piston rod 127, with the lower end 119 of the intermediate lever.

This movement of the piston 125 is limited by engagement with a magnetically controlled stop 132 also disposed in the chamber 123 and having a supporting plunger rod 133 slidable in a stuffing gland 134 in one end of the chamber 123. The plunger rod 133 may pass through the hollow core of an electro-magnet 135 and terminate in an armature 136 adapted to be attracted toward the electro-magnet 135 against non-magnetic stops 137. The electro-magnet 135 is preferably constantly connected to the trolley 37 by a conductor 138 and to a ground connection 139, the essential characteristic being that the electro-magnet 135 be energized at all times that power is available to operate the vehicle. When the electro-magnet 135 is energized the piston may be moved to the left until it engages the stop 132, and this movement is made such that the rotation of the intermediate lever 114 caused thereby is the same as caused by depressing the foot pedal toe portion 46 until the collar 74 on the drive rod 68 just engages but does not compress the spring 75. When the electro-magnet 135 is not energized, as when power fails or the trolley comes off, the piston 125 may move to the left to cause rotation of the intermediate lever 114 corresponding to that caused by a movement of the foot pedal which compresses the spring 75, i. e., an emergency operation of the brakes.

The entire brake valve device 11 may be supported from a convenient surface by a bracket 142.

For controlling the operation of the rheostat 16 in accordance with fluid pressures established in supply pipe 13, I provide a pressure actuated device 17 comprising a flexible diaphragm 143 mounted in an enclosing casing 144 connected with the supply pipe 13. Fluid under pressure from pipe 13 will enter chamber 140 at one side of the diaphragm 143 actuating the bell crank 145 through the rod 146 to cause carbon discs 147 in the rheostat to be compressed and thus vary the current supplied to the exciting windings 15 of the eddy current brakes. While I have shown a specific type of rheostat and one arrangement for operating it I do not wish to be limited to any specific means for varying the current supplied the exciting windings 15 in accordance with the fluid pressure in pipe 13.

The magnet valve device 18, forming part of the interlock mechanism, comprises a casing 148 having a valve chamber 149 in constant communication with the fluid brake cylinders 14 by pipes 150. The chamber 149 contains a double beat valve 152 urged toward an upper seat by a spring 153 and toward a lower seat by energization of an electro-magnet 154 attracting an armature 151 in the end of a valve stem 141. The double beat valve 152 coacts with the upper seat to control communication between the chamber 149 and chamber 155 which is in communication with the atmosphere by passage 156, while it simultaneously coacts with the lower seat to control communication between chamber 149 and supply pipe 13.

For controlling the opening and closing of the circuit breaker 42 for deenergizing and energizing, respectively, the electric brake exciting windings 15 in accordance with fluid pressures, I have provided a pressure actuated device in the form of Bourdon tube 20 connected to the supply pipe 13. This tube may have a stationary contact 157 connected to a source of current supply, as a battery 159, and a movable contact 158 connected to a slow-release relay 160 in series with the actuating winding of the circuit breaker 42. The other terminal of the circuit breaker winding is connected to the opposite pole of the battery 159. The Bourdon tube 20 is preferably designed to be actuated by relatively low or initial fluid pressures in pipe 13 to open contacts 157 and 158 to deenergize circuit breaker 42 and thereby close contacts 43 to energize the electric brake exciting windings 15.

To maintain energization of the exciting windings 15 as long as the electric brakes are effective in stopping the vehicle quickly, I provide a checking relay 21 connected to the checking windings 22 of the electric brakes, as shown, and adapted to be energized therefrom sufficiently to open contacts 163 normally closed when checking relay 21 is deenergized. One of the contacts 163 is preferably connected to one terminal of the circuit breaker 42 through the contacts 165 of the slow-release relay 160 and a resistance device 165 having a resistance value substantially equal to that of the slow-release relay winding. The other of the contacts 163 is preferably connected to the battery 159 through contacts 166 of a quick-release, slow pick-up, no power relay 167, which is connected to the trolley 37 and ground connection 38, as shown. When the electric brakes are bringing the vehicle to a stop according to a predetermined rate the checking relay 21 will be sufficiently energized to open contacts 163, thereby preventing opening of circuit breaker contacts 43. The slow-release relay 160 is preferably of such a design that upon deenergization thereof, as by opening of contacts 157 and 158 of Bourdon tube 20, the contacts 164 are not closed until the electric brakes are functioning and checking relay 21 is energized. If the speed of the vehicle is so low that the electric brakes are ineffective relay 21 will not be energized and circuit breaker 42 will open contacts 43 to deenergize the exciting windings 15.

To control the application of the fluid pressure brakes in accordance with the application of the electric brake I have provided contacts 168 in connection with checking relay 21 and in series with the electro-magnet 154 of the magnetic valve device 18. These contacts 168 are adapted to be closed when checking relay 21 is energized, i. e., when the electric brakes are effective, to prevent concurrent application of both the fluid and electric brakes, except for an emergency condition to be described later. When contacts 168 are closed the electro-magnet 154 is energized from the battery 159 through the circuits shown, contacts 169 and 170 of the Bourdon tube 19 being closed, except for an emergency condition to be described presently. When the electro-magnet 154 is energized the double beat valve 152 is seated in its lower position to cut off the supply of fluid under pressure to and vent the brake cylinders 14. Thus when the electric brakes are effective the fluid pressure brakes are ineffective, but are applied simultaneously with the release of the electric brakes.

To provide for concurrent application of both the electric and fluid brakes for making emergency stops I have provided and connected the Bourdon tube 19 to the supply pipe 13, as shown, and connected its contacts 169 and 170 as already described. This Bourdon tube is designed to be actuated by higher fluid pressures in pipe 13 than are used in making normal stops, so that contacts 169 and 170 are opened to deenergize electro-magnet 154 of the magnetic valve device 18 to cause the double beat valve 152 to seat in its upper position and thereby permit fluid under pressure to be supplied to the brake cylinder 14. Thus both fluid and electric brakes are applied in making an emergency stop from speeds where the electric brakes are effective.

In operation, when current is supplied from the track and trolley to a vehicle embodying the apparatus shown and connected as in Fig. 1, and pressure has been applied to the heel portion 45 but not the toe portion 46 of the foot pedal 44, the condition of the apparatus will normally be as there shown; wherein no power relay 167 is energized closing contacts 166; circuit breaker 42 is energized in series with slow-release relay 160, opening contacts 43 and 164, and thereby preventing energization of the electric brake exciting windings 15; checking relay 21 is deenergized, whereby contacts 163 are closed and contacts 168 are open preventing energization of electro-magnet 154 of the magnetic valve device 18; and the electro-magnet 135 of the emergency device 122 is energized to position the stop 132 to its extreme right position. These conditions may obtain with the vehicle at rest or while running.

When the vehicle is running, the operator maintains the heel portion 45 of the foot pedal depressed so that the arm 65 is held out of contact with the valve stem 66. The valve 59 will then be held unseated by fluid pressure from the main reservoir 12, while the valve 60 is maintained seated by the spring 63. As a result, fluid under pressure is supplied from the main reservoir 12 through pipe 56, past the open valve 59 to pipe and passage 58, thence to piston chamber 123 of the emergency device. The piston 125 is therefore normally held in the position shown in Fig. 2 by fluid pressure in the piston chamber 123, against the pressure of spring 126.

When it is desired to make a normal stop from a running condition the operator depresses the toe portion 46 of the foot pedal. This in turn causes a pull on the cable 73 rotating the levers 72 and 114 of the brake valve device in a clockwise direction. Rotation of lever 114 pushes the floating pivot carrier 109 to the right.

It is to be understood that the supply valve spring 85 and the release valve spring 98 are of such design that they offer less resistance than does the piston spring 93. Also, the spring 98 offers less resistance than does spring 85, so that upon movement of the pivot carrier 109 to the right the levers 102 rotate about their pivot 108 to first compress spring 98 and thereby seat release valve 97 to close communication between pressure chamber 80 and the atmosphere, and to subsequently compress spring 85 to unseat supply valve 84 to bring pressure chamber 80 into communication with supply valve chamber 82 and hence have fluid under pressure supplied thereto. During this operation of the supply and release valves, piston spring 93 is not appreciably compressed.

Fluid under pressure supplied to chamber 80 by the opening of supply valve 84 flows to the pipe 13 and if the double beat valve 152 of the magnet valve device 18 is at its upper seat would also flow to the brake cylinders 14 through pipes 150. However, the Bourdon tube 20, which is actuated by initial or low fluid pressures, opens contacts 158 and 157, whereupon circuit breaker 42 is deenergized closing contacts 43 and thereby energizing the electric brake exciting windings 15. Assuming the speed of the vehicle to be high enough, upon energization of the exciting windings 15 the checking windings 22 have an E. M. F. induced therein, as heretofore described, sufficient to energize the checking relay 21, thus closing contacts 168 and energizing the electromagnet 154 of the magnet valve device 18. Energization of electro-magnet 154 causes the double beat valve 152 to seat in its lower position, closing off communication between the supply pipe 13 and the brake cylinders 14, and at the same time opening pipes 150 to the atmosphere through ports 156.

Opening of contacts 158 and 157 of Bourdon tube 20 also deenergizes slow-release relay 160 but the contacts 164 are not closed until the electric brakes function and checking relay 21 is energized, thereby opening contacts 163 and thus preventing energization of circuit breaker 42, as has been already described.

Fluid under pressure in pipe 13 also flows to the pressure actuated device 17 and acts upon its diaphragm 143 to cause the rheostat carbon discs 147 to be compressed and thus permit a higher current to flow to the exciting windings 15, increasing the effectiveness of the electric brakes.

The operator depresses the toe portion 46 of the foot pedal to the extent corresponding with the braking force desired, and when the fluid pressure in chamber 80 of the brake valve device has been increased to the desired degree, it will act upon the piston 87 to overcome the resistance of the spring 93 to move the piston to the right, permitting the supply valve 84 to be moved by its spring 85 toward its seated position so as to cut off further supply of fluid under pressure to chamber 80. Thus the fluid pressure in chamber 80, and hence that supplied to the pipe 13, is at all times in accordance with, or proportional to, movement of the toe portion of the foot pedal. Since the current supplied to the electric brake exciting windings 15 is regulated by this same pressure, through the pressure actuated device 17 and the rheostat 16, it follows that the electric braking "force" is proportional to foot pedal position.

As the vehicle slows down due to the braking effect of the electric brakes, a low speed will be reached where the checking relay 21 will be insufficiently energized and contacts 168 will be opened and contacts 163 closed. The contacts 164 of slow-release relay 160 will have closed in the meanwhile so that closing of contacts 163 energizes circuit breaker 42 to open contacts 43 and thus deenergize exciting windings 15. The electric brakes thus become ineffective. Simultaneously, the opening of contacts 168 deenergizes the electro-magnet 154 of the magnet valve device 18, permitting the double beat valve 152 to seat at its upper position by action of its spring 153, thus bringing pipes 13 and 150 into communication and permitting fluid under pressure to be supplied to the brake cylinders 14. Since the same fluid pressure actuates both the electric brakes and the friction brakes, the parts may be designed so that the latter are applied with substantially the same braking force as that corresponding to the effect of the electric brakes when they were released. The vehicle will therefore be brought to a stop smoothly and quickly.

In making a normal stop the movement of the foot pedal 44 is such that the collar 74 on the drive rod 68 does not compress the spring 75. When it is desired to make an emergency stop the operator presses the foot pedal a sufficient amount to compress the spring 75. This movement actuates the intermediate lever 114 of the brake valve device 11 through its maximum degree of rotation so as to push the pivot carrier 109 inwardly far enough to open wide the supply valve 84, so as to permit the build up of fluid pressure in the chamber 80 to the maximum degree permitted by the operation of the brake valve device. This higher than normal, or emergency, pressure acts upon the Bourdon tube 19 to open contacts 169 and 170 thus deenergizing the electro-magnet 154 of the magnet valve device, or preventing its energization if not already energized. If the speed of the vehicle is great enough both the electric and friction brakes are applied concurrently. Since both are applied in accordance with the fluid pressures in pipe 13 they will be applied with maximum, or emergency, braking force.

It will therefore be seen that the foot pedal has both a normal travel and an emergency travel, and that for both of these the proper application of the brakes is automatically taken care of.

If the operator should remove his foot from the foot pedal, either by accident or design, the arms 47 are rotated by the force of springs 64, so that lever 65 engages the valve seat 66 to unseat the valve 60 and seat the valve 59. The supply of fluid under pressure to cylinder 123 of the emergency device 122 is thus cut off and the cylinder is vented to the atmosphere past the unseated valve 60. Piston 125 is therefore moved to the left by spring 126 until it engages the stop 132. This movement causes latch block 129 to engage the end 119 of lever 114 to actuate the supply and release valves 84 and 98 to cause the brakes to be applied as when making a normal stop.

If at the same time the operator removes his foot from the foot pedal the electric power is cut off, as by failure of power, the trolley coming off, etc., the electro-magnet 135 of the emergency device 122 is deenergized, so that the stop 132 does not limit the travel of the piston 125 and it may move further to the left. The latch block 129 then rotates the lever 114 through the same swing as when applying the brakes for making an emergency stop. The friction brakes are therefore applied with emergency braking force.

If the electric power is cut off while the operator still has his foot on the foot pedal, or while he is depressing it to apply the brakes, the no power relay 167 is deenergized, opening contacts 166 in series with the circuit breaker 42; checking relay 21 is deenergized due to deenergization of the exciting windings 15; and electromagnet 154 of the magnet valve device 18 is deenergized. As a result, the electric brakes become ineffective and the fluid pressure brakes are applied. The fluid pressure brakes are therefore automatically applied whenever the electric brakes are released due to failure of power. When electric power returns the slow pick-up characteristic of the no power relay 167 delays the release of the fluid pressure brakes until the electric brakes become effective and energize checking relay 21, by delaying the closure of the circuit to the circuit breaker 42 through contacts 166. By the time contacts 166 are closed the checking relay 21 will have been energized by the checking windings 22, if the speed of the vehicle is such that the electric brakes are effective, and the contacts 168 are thereby closed to energize electro-magnet 154 to cut off the supply of fluid under pressure to the brake cylinders 14.

When the vehicle has been brought to a stop it may be held at rest by depressing the foot pedal to apply the brakes, or the operator may remove his foot from the foot pedal in which case the brakes are applied as heretofore described.

While I have not shown the usual additional safety devices commonly used in connection with vehicle brake systems, it will be quite apparent to those skilled in the art that these devices are readily adaptable to my brake system without material modification of its structure or impairment of its functioning.

In practice I have found that the wearless type of electric brake illustrated and described herein may be made effective to dissipate practically all of the energy of momentum of a vehicle. As one example, I have found that a vehicle equipped with my invention may be effectively braked from a speed of 45 miles per hour down to a speed of approximately 4 miles per hour by application of the electric brakes alone, leaving only a small remaining amount of energy of momentum to be dissipated by the friction brakes. Since the energy to be dissipated in stopping such a vehicle is proportional to the square of its speed, it is obvious that in such a case as described the electric brakes dissipate over 99% of the stored energy of momentum.

From the foregoing description it will be seen that I have provided a combined electric and friction brake system in which the electric brake equipment is effective for braking a vehicle at relatively high speeds, while the friction brake equipment is effective for braking at relatively low speeds, both equipments being actuated from a single manually conditioned fluid pressure control means and the brakes in both being applied according to fluid pressures established by this control means. It will also be seen that I have provided interlocking means for automatically effecting successive applications of the electric and friction brakes when making normal stops, and for effecting concurrent application of the two when making emergency stops. It will be seen further that I have also provided means for effecting an application of the friction brakes whenever the electric brakes are released due to some fault in the electric system or when power fails.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake system the combination of a friction brake, an electric brake operable to apply a braking force which diminishes as the speed of the vehicle diminishes, means for cutting in the friction brake when power supply to the electric brake fails while the electric brake is in action, and means for delaying the cutting out of the electric brake while the friction brake is in action upon the return of power supply.

2. In a braking system for vehicles, the combination with a friction brake and fluid pressure controlling means for controlling the pressure of a fluid under pressure supplied to effect an application of the friction brake, of an electric brake operable to apply a braking force which diminishes with the speed of the vehicle, means controlled by the fluid under pressure supplied to effect an application of the friction brake for effecting an application of the electric brake, and means for cutting the electric brake out of action with a delayed time interval when the speed of the vehicle is below a predetermined point at the time of supply of fluid under pressure to brake the vehicle.

3. In a vehicle braking system, the combination with a rotatable braking member, of means for engaging said member to produce a friction braking effect, a stator having an exciting winding for coacting with said member to produce an electrical braking effect, a stationary winding inductively related to said exciting winding and adapted to have a voltage established therein corresponding to the degree of said electrical braking effect, and means responsive to said voltage for preventing said first means from operating while the electrical braking effect is above a chosen value.

4. In a vehicle braking system, the combination with a rotatable braking member, of a friction brake element adapted to engage said member to produce a friction braking effect thereon, electrical means for producing a magnetic flux in said member to produce an eddy current braking effect thereon, means for causing pulsations in said flux when said rotatable member is rotating, an auxiliary winding responsive to said pulsations, and means connected to said winding for controlling the operation of the other of said means.

5. In a vehicle braking system, the combination with a rotatable braking member, of a brake element adapted to engage said member to produce a friction braking effect thereon, electrical means having an exciting winding for producing a magnetic flux in said member to produce an eddy current braking effect thereon, an auxiliary winding inductively related to said exciting winding and adapted to have a voltage produced therein by said flux, and means for automatically rendering said electrical means ineffective to produce an eddy current braking effect and said brake element effective to produce a friction brake effect when the voltage in said winding diminishes below a predetermined value.

6. In a vehicle brake system, the combination with an electric brake device, of switch means normally energized to prevent operation of said brake device, means for deenergizing said switch means to effect an application of said brake device, means operating with a time delay interval for reenergizing said switch means, and means responsive to operation of said brake device for preventing said last means from reenergizing said switch means.

7. In a vehicle brake system, in combination, fluid pressure brake means, electric brake means operable to produce a braking effect which diminishes at low rotational speeds, a control element manually operable through different degrees of movement, means for effecting an application of the electric brake means to a degree corresponding to the degree of movement of said element, and means responsive to operation of the electric brake means for rendering the fluid pressure brake means ineffective to produce a braking effect while the electric brake means is effective and for simultaneously cutting the electric brake means out of action and cutting the fluid pressure means into action to a degree corresponding to the degree of movement of said element when the effectiveness of the electric brake means diminishes below a predetermined value.

8. In a vehicle brake system, in combination, fluid pressure brake means, electric brake means having a rotor and a stator operable to produce a braking effect which diminishes at low rotational speeds, said stator having a stationary exciting winding and a stationary checking winding inductively related to said exciting winding, said checking winding being adapted to have produced therein voltages corresponding to the braking effects produced by said stator and rotor, a control element manually operable through different degrees of movement, means for effecting application of the electric brake means and the fluid pressure brake means to a degree corresponding to the degree of movement of said element, and means responsive to voltage produced in said checking winding for rendering said fluid pressure brake means ineffective to produce a braking effect while the electric brake means is effective.

9. In a vehicle brake system, in combination, fluid pressure brake means, electric brake means having a rotor and a stator operable to produce a braking effect which diminishes at low rotational speeds, said stator having an exciting winding and a checking winding inductively related to said exciting winding, said checking winding being adapted to have produced therein a voltage corresponding to the braking effect produced by said stator and rotor, a control element manually operable through different degrees of movement, means for effecting application of the electric brake means and the fluid pressure brake means to a degree corresponding to the degree of movement of said element, and means responsive to the voltage produced in said checking winding for rendering said fluid pressure brake means ineffective to produce a braking effect while the electric brake means is effective and for simultaneously cutting the electric brake means out of action and cutting the fluid pressure brake means into action when the voltage produced by said checking winding diminishes below a predetermined value.

10. In a vehicle brake system, in combination, a brake cylinder, an electric brake device having a rotor and a stator operable to produce a braking effect which diminishes at low rotational speeds, said stator having a stationary exciting winding and a stationary checking winding inductively related to said exciting winding, said checking winding being adapted to have produced therein voltages corresponding to the braking effects produced by said rotor and stator, means for supplying current to said exciting winding, means for supplying fluid under pressure to said brake cylinder, electroresponsive valve means operable when energized to cut off the supply of fluid under pressure to and operable to release fluid under pressure from said brake cylinder, and means responsive to a predetermined voltage produced by said checking winding for energizing said electroresponsive valve means.

11. In a vehicle brake system, in combination, a brake cylinder, an electric brake device having a rotor and a stator operable to produce a braking effect, said stator having an exciting winding and an auxiliary winding inductively related to said exciting winding and being adapted to have produced therein voltages corresponding to the braking effect produced by said rotor and stator, pressure operated means for controlling the degree of energization of said exciting winding, means for establishing a communication through which fluid under pressure is supplied to said brake cylinder, means for connecting said pressure operated means and said communication means to a source of fluid under pressure, a normally deenergized magnet valve device operable when energized to close communication between the brake cylinder and said supply and to vent the brake cylinder to the atmosphere, and means responsive to a predetermined voltage produced in said auxiliary winding for energizing said magnet valve device.

12. In a vehicle brake system, in combination, a brake cylinder, an electric brake device, means for establishing a communication through which fluid under pressure is supplied to said brake cylinder, means for supplying fluid under pressure to said communication, means responsive to a low value of the pressure of fluid supplied to said communication for connecting said electric brake device to a source of current supply, and means responsive to the effectiveness of said electric brake device for closing said communication to the brake cylinder.

13. In a vehicle brake system, in combination, a brake cylinder, an electric brake device, means for establishing a communication through which fluid under pressure is supplied to said brake cylinder, a magnet valve device in said communication operable when energized to close said communication to a supply of fluid under pressure, means for effecting a supply of fluid under pressure to said communication, switch means adapted when closed to connect said electric brake device to a source of power supply, means responsive to a low value of pressure of fluid supplied to said communication for closing said switch means, and means responsive to operation of said electric brake device for energizing said magnet valve device.

14. In a vehicle brake system, in combination, a brake cylinder, an electric brake device having a rotor and a stator, said stator having an exciting winding and a checking winding inductively related to said exciting winding and being adapted to have produced therein voltages corresponding to the braking effects produced by said rotor and stator, means for establishing a communication through which fluid under pressure is supplied to the brake cylinder, means for supplying fluid under pressure to said communication, switch means adapted when closed to connect said exciting winding to a source of power supply, means responsive to a low value of pressure of fluid supplied to said communication for effecting closing of said switch means, time delay means for subsequently effecting opening of said switch means, electroresponsive valve means operable when energized to close said communication to said brake cylinder and to vent said brake cylinder to the atmosphere, and means responsive to voltage produced in said checking winding for energizing said electroresponsive valve means and for preventing said time delay means from opening said switch means.

15. In a vehicle brake system, in combination, fluid pressure brake means, electric brake means, a pipe for supplying fluid under pressure to said fluid pressure means, means for supplying fluid under pressure to said pipe, means responsive to a low value of pressure of fluid supplied to said pipe for connecting said electric brake device to a source of power supply, means operative while said electric brake device is effective for closing communication between said pipe and said brake cylinder, and means responsive to a high value of pressure of fluid supplied to said pipe for preventing said last means from closing said communication to said brake cylinder.

16. In a vehicle brake system, in combination, a brake cylinder, an electric brake device, a pipe for supplying fluid under pressure to said brake cylinder, a circuit for supplying current to said electric brake device, means for supplying fluid under pressure to said pipe, means responsive to a low value of pressure of fluid supplied to said pipe for connecting said circuit to a source of power supply, means for regulating the current supplied to said electric brake device according to the pressure of fluid supplied to said pipe, valve means operable to close communication between said pipe and said brake cylinder, means responsive to operation of said electric brake device for operating said valve means to close communication to said brake cylinder, and means responsive to a high value of pressure of fluid supplied to said pipe for operating said valve means to open communication from said pipe to said brake cylinder.

17. In a vehicle brake system, in combination, a brake cylinder, an electric brake device, a pipe for supplying fluid under pressure to the brake cylinder, means for supplying fluid under pressure to said pipe, normally closed contacts, means responsive to a low value of pressure of fluid supplied to said pipe for opening said contacts, means responsive to opening of said contacts for connecting said electric brake device to a source of power supply, and means responsive to operation of said electric brake device for closing communication between said pipe and said brake cylinder while said electric brake device is effective and operable when said electric brake device decreases in effectiveness for opening said communication to permit fluid under pressure to be supplied to the brake cylinder.

18. In a vehicle brake system, in combination, a brake cylinder, an electric brake device, a pipe for supplying fluid under pressure to the brake cylinder, means for supplying fluid under pressure to said pipe, a first set of normally closed contacts, a first Bourdon tube responsive to a low value of pressure in said pipe for opening said first set of contacts, means responsive to opening of said first set of contacts for connecting said electric brake device to a source of power supply, a magnet valve device operable when energized to close communication between said pipe and the brake cylinder and when deenergized to open said communication, means responsive to operation of said electric brake device for energizing said magnet valve device, a second set of normally closed contacts adapted when opened to deenergize said magnet valve device, and a second Bourdon tube responsive to a high value of pressure in said pipe for opening said second set of contacts.

19. In a vehicle brake system, in combination, a brake cylinder, an electric brake device having an exciting winding and a checking winding inductively related to said exciting winding and being adapted to have produced therein voltages corresponding to the braking effects produced by said electric brake device, a pipe for supplying fluid under pressure to the brake cylinder, means for supplying fluid under pressure to said pipe, a first set of normally closed contacts, a first Bourdon tube responsive to a low value of pressure in said pipe for opening said contacts, a circuit breaker operable upon opening of said first set of contacts for connecting said exciting winding to a source of current supply, timing means also responsive to opening of said first set of contacts for subsequently causing said circuit breaker to disconnect said exciting winding from said source, a magnet valve device operable when energized to close communication between said pipe and brake cylinder and operable when deenergized to open said communication, means responsive to voltages in said checking winding above a predetermined value for preventing said timing means from operating said circuit breaker and for energizing said magnet valve device, a second set of normally closed contacts adapted when opened to deenergize said magnet valve device, and a second Bourdon tube responsive to a high pressure in said pipe for opening said second set of contacts.

20. In a vehicle brake system, in combination, an electric brake device operable to produce a braking effect which diminishes at low speeds, a circuit for supplying current to said electric brake device, a circuit breaker for opening and closing said circuit, means for effecting closing of said circuit breaker to close said circuit, said circuit breaker remaining closed upon a failure of the current supply, means for causing opening of said circuit breaker after a predetermined delayed interval of time upon the return of the current supply, and means responsive to operation of the electric brake device for preventing said opening of said circuit breaker when the braking effect produced is above a chosen value.

21. In a vehicle brake system, in combination, a brake cylinder, an electric brake device operable to produce a braking effect which diminishes at low rotational speeds, a circuit for supplying current to said electric brake device, switch means for controlling opening and closing of said circuit, means for supplying fluid under pressure to the brake cylinder upon deenergization of said electric brake device due to a failure of the current supply and operable upon reenergization of said electric brake device due to a return of said current supply for cutting off the supply to and releasing fluid under pressure from the brake cylinder, and means for opening said switch means with a delayed time interval upon return of said current supply when the braking effect produced by the electric brake device is below a chosen value.

22. In a vehicle brake system, in combination, fluid pressure brake means, electric brake means, pressure operated means for varying the degree of application of the electric brake means, manually controlled means for effecting a supply of fluid under pressure to one only of said fluid pressure brake means and pressure operated means, and means normally subject to fluid under pressure and operable upon a decrease of said pressure below a predetermined value for also effecting a supply of fluid under pressure to one only of said fluid pressure brake means and pressure operated means independently of operation of said manually controlled means.

23. In a vehicle brake system, in combination, an electric brake device, a circuit for connecting said brake device to a source of power supply, pressure operated means for varying the degree of current supplied to said brake device, a brake valve device for supplying fluid under pressure to operate said pressure operated means, manually operated means for operating said brake valve device, and means normally subject to fluid under pressure and operable upon a decrease of said pressure below a predetermined value for actuating said brake valve device to supply fluid under pressure to said pressure operated means.

24. In a vehicle brake system, in combination, a brake cylinder, an electric brake device, a circuit for connecting said electric brake device to a source of power supply, pressure operated means for regulating the degree of current supplied to said electric brake device, a brake valve device for supplying fluid under pressure to the brake cylinder and to said pressure operated means, manually operative means for operating said brake valve device, and safety means rendered operable upon concurrent release of manually applied pressure by the operator and failure of the power supply for actuating said brake valve device to supply fluid under pressure to said pressure operated means and to said brake cylinder to a maximum degree.

25. In a vehicle brake system, in combination, a brake cylinder, an electric brake device, a circuit for supplying current to said electric brake device, pressure actuated means for varying the degree of current supplied to said electric brake device, a brake valve device for supplying fluid under pressure to said pressure actuated means and to said brake cylinder, manually operative means for operating said brake valve device, and safety means normally subject to fluid under pressure and responsive to power supplied to effect an application of the electric brake device and operable upon a decrease in said pressure and failure of said power for effecting operation of said brake valve device to supply fluid under pressure to the brake cylinder and to the pressure actuated means.

26. In a vehicle brake system, in combination, brake means, said brake means being operable according to the supply of fluid under pressure thereto, a brake valve device for supplying fluid under pressure to operate said brake means, actuating means normally subject to fluid under pressure and operable upon a decrease in pressure to actuate said brake valve device to supply fluid under pressure to said brake means to a maximum degree, and electrically controlled means for governing movement of said actuating means to control the degree of fluid under pressure supplied by said brake valve device.

27. In a vehicle brake system, in combination, brake means, said brake means being operated according to the degree of fluid under pressure supplied thereto, a brake valve device operable manually to supply fluid under pressure to said brake means, actuating means normally subject to fluid under pressure and operable upon a decrease in pressure to actuate said brake valve device to supply fluid under pressure to said brake means to one of two degrees, and an electrically controlled stop operable when energized to limit movement of said actuating means to one degree and operable when deenergized to permit movement of said actuating means to a greater degree.

28. In a vehicle brake system, in combination, brake means, a control device having a lever pivotally mounted at one end and a foot pedal pivotally mounted at the other end of said lever, said lever being operated by heel pressure on said foot pedal and said foot pedal being operable relative to said lever by ankle movement of an operator, means responsive to movement of said foot pedal by ankle movement of the operator for effecting an application of said brake means according to the degree of ankle movement of said foot pedal, means normally subject to fluid under pressure and operable upon a decrease in fluid pressure for effecting an application of said brake means to a maximum degree, and a valve controlled by said lever and operated upon release of said heel pressure for decreasing the fluid pressure acting upon said last means.

29. In a vehicle brake system, in combination, a brake cylinder, an electrodynamic brake device having a rotor and a stator, means for supplying current to said stator only to produce a braking effect, a magnet valve device operable when deenergized to open a communication through which fluid under pressure is supplied to said brake cylinder and operable at all times when energized to close said communication and to establish a second communication through which fluid under pressure is released from said brake cylinder, a circuit for supplying current to said magnet valve device, and a relay connected to said stator only and operable when energized above a predetermined degree to close said circuit.

30. In a vehicle brake apparatus, in combination, a brake device operable by electric means and by fluid pressure means for producing a braking effect on a vehicle, means for producing a pulsating electrical effect while said vehicle is in motion, and means responsive to said electrical effect for preventing operation of said brake device by said fluid pressure means.

31. In a vehicle brake apparatus, in combination, a brake device operable by electric means and by fluid pressure means for producing a braking effect on a vehicle, means for producing a pulsating electrical effect while said vehicle is in motion, and means responsive to said electrical effect for preventing operation of said brake device by said fluid pressure means, but effecting operation of said brake device by said fluid pressure means when said electrical effect ceases.

JOHN W. LOGAN, Jr.

DISCLAIMER 2,012,747.—*John W. Logan, Jr.*, Wilkinsburg, Pa. VEHICLE BRAKING SYSTEM.
Patent dated August 27, 1935. Disclaimer filed April 11, 1936, by the patentee; the assignee, *The Westinghouse Air Brake Company*, consenting.
Hereby enters this disclaimer to claim 28 of said patent.
[*Official Gazette May 12, 1936.*]